United States Patent [19]

Marvin et al.

[11] Patent Number: 4,614,316

[45] Date of Patent: Sep. 30, 1986

[54] STOWABLE SLIDING FILTER

[75] Inventors: David J. Marvin, Wallingford; Walter F. Darges, Wayne, both of Pa.

[73] Assignee: The Boeing Company

[21] Appl. No.: 664,650

[22] Filed: Oct. 25, 1984

[51] Int. Cl.[4] .................... B64D 43/00; B62D 25/14; G01D 11/28

[52] U.S. Cl. .................................... 244/1 R; 296/70; 180/90; 362/23

[58] Field of Search .................. 244/1 R; 73/432 AD; 180/90; 312/325, 326, 109; 296/70; 362/23, 28, 293, 351; 358/245, 247, 253, 254, 255; 350/1.1, 1.6, 1.7, 315, 318; D12/192

[56] References Cited

U.S. PATENT DOCUMENTS

| | | | |
|---|---|---|---|
| 3,083,293 | 3/1963 | Fandrey | 362/293 |
| 3,418,426 | 12/1968 | Schlegel et al. | 358/252 |
| 3,913,701 | 10/1975 | Williams | 296/70 |
| 4,180,847 | 12/1979 | Cresko et al. | 362/293 |
| 4,181,925 | 1/1980 | Burrows et al. | 362/23 |
| 4,225,005 | 9/1980 | Okabayashi | 180/90 |
| 4,398,685 | 8/1983 | Task et al. | 244/135 A |
| 4,427,264 | 1/1984 | Kamerling | 358/253 |

Primary Examiner—Galen L. Barefoot
Assistant Examiner—L. M. Fiorito
Attorney, Agent, or Firm—Jones, Tullar & Cooper

[57] ABSTRACT

An IR filter assembly for use with a lighted instrument panel mounted to a control panel includes a support frame surrounding the lighted instrument panel but through which the lighted instrument panel is visible, and IR filter panel mounting bracket to which a IR filter panel is mounted and a stowing bracket. The filter bracket is mounted to the support frame and is displaceable along the support frame and into the stowing bracket for stowing the IR filter panel when not in use. For operation, the IR filter panel is withdrawn from the stowing bracket and locked to the support frame such that the IR filter panel covers the lighted instrument panel.

8 Claims, 10 Drawing Figures

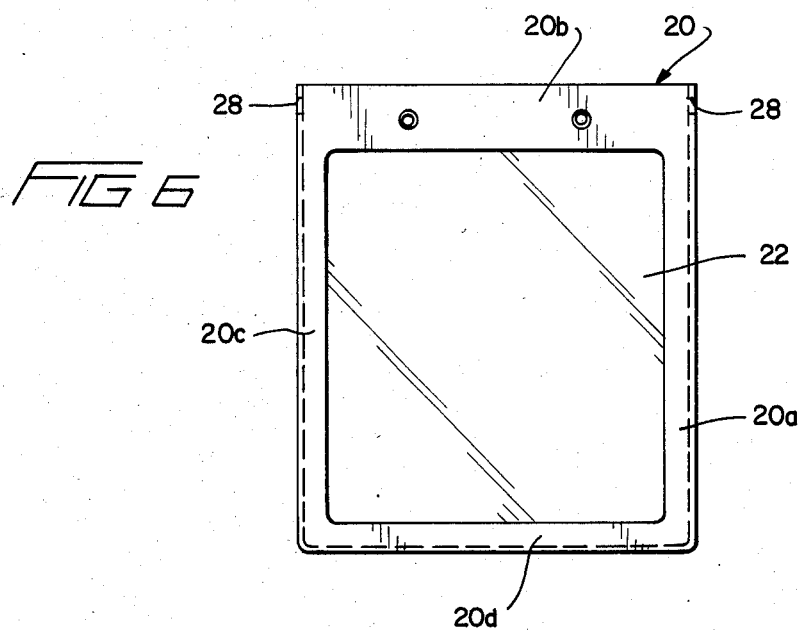
FIG 6
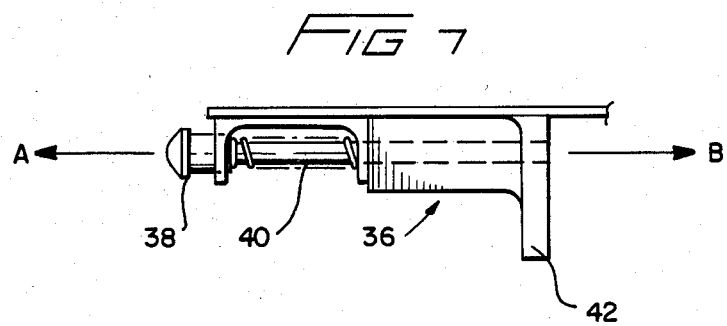
FIG 7
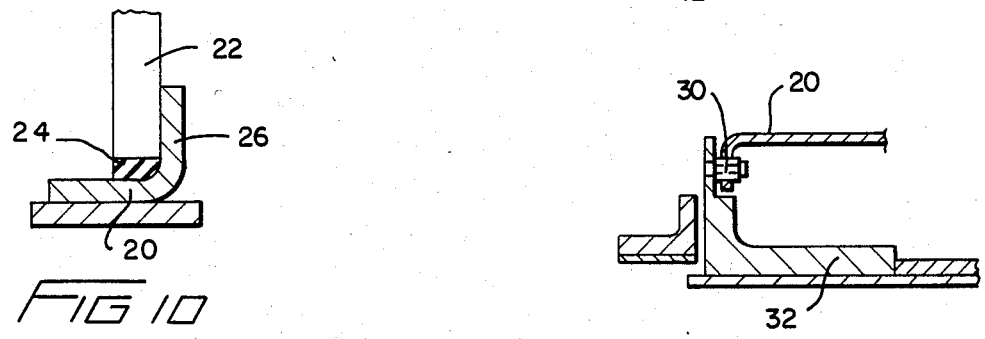
FIG 10
FIG 9
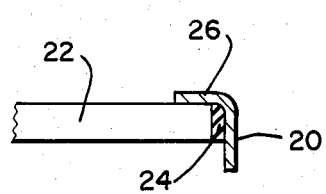
FIG 8

STOWABLE SLIDING FILTER

TECHNICAL FIELD

The present invention is to an IR Filter Assembly and to its mounting and stowing to the front panel of a cockpit.

BACKGROUND OF THE INVENTION

The need for round-the-clock military operations has resulted in the use of night-vision goggles (NVG). These goggles amplify the lighting in the red and infrared regions of the electromagnetic system. Lighting in the crew station or cockpit of an aircraft should be filtered so that it will not impair the operation of these goggles and be visible to the unaided eye.

In the cockpit is an annunciator panel (caution and advisory panel) mounted on the instrument panel which consists of a number of lighted cartridges, generally amber in color which extend from the base of the cockpit front panel. Adaptation of the panel for NVG can be accomplished by several methods. The first is by opening the individual cartridges and replacing the amber colored filters with blue-green filters. The problem with this is that it is suspected that the messages can be lighted to a sufficient intensity to be visible in high ambient light conditions such as sunlight. In this case, it would result in a dedicated panel or reworking the panel constantly as the mission changes from night to day or interchanging the entire annunciator panel with a daylight panel. Another solution would be to cover the entire annunciator panel with a large blue-green filter. The problem with this is stowage when it is not needed and having it readily available for use. Hinging a panel of this size, approximately 5"×5.2" about a vertical or horizontal axis would present a visual obstruction or interfere with axis to switches on the instrument panel.

Preferably, therefore, a filter is needed which can be removed to provide sunlight readability. It must also be retained as part of the instrument panel.

SUMMARY OF THE INVENTION

The filter assembly according to the present invention is designed to be easily accessible when needed and readily stowable when not needed. It is intended as a permanent cockpit control panel accessory which can be accessed by either crewmember and brought to its operative position quickly whose purpose it is mounted directly to the control panel and stowable therein. The assembly comprises in its essential elements a mounting plate assembly (a vertical frame) to which is attached a horizontal bracket and track assembly. Attached to the mounting plate are upper and lower detent brackets which are located symmetrically about the vertical center line of the annunciator panel with which the assembly is associated. The mounting plate is installed between the annunciator panel and the instrument panel and utilizes the same mounting screws. Ejecting through a slotted mounting plate is a sliding hinge. Attached to the sliding hinge, by means of hinge pins, is the filter frame assembly which contains the filter glass and locking pins.

BRIEF DESCRIPTION OF THE DRAWINGS

Ten figures have been selected to illustrate a preferred embodiment of the present invention. These figures are believed to sufficiently detail the invention to enable the person skilled in the art to understand and practice the invention. Illustrated are:

FIG. 6 is a plan view of a filter frame of the filter assembly;

FIG. 7 is a detailed view of the retention mechanism of the filter assembly;

FIG. 8 is a detailed view taken along lines 8—8 of FIG. 4;

FIG. 9 is a view taken along lines 9—9 of FIG. 4; and

FIG. 10 is a view taken along lines 10—10 of FIG. 4.

DETAILED DESCRIPTION

Figure 1:
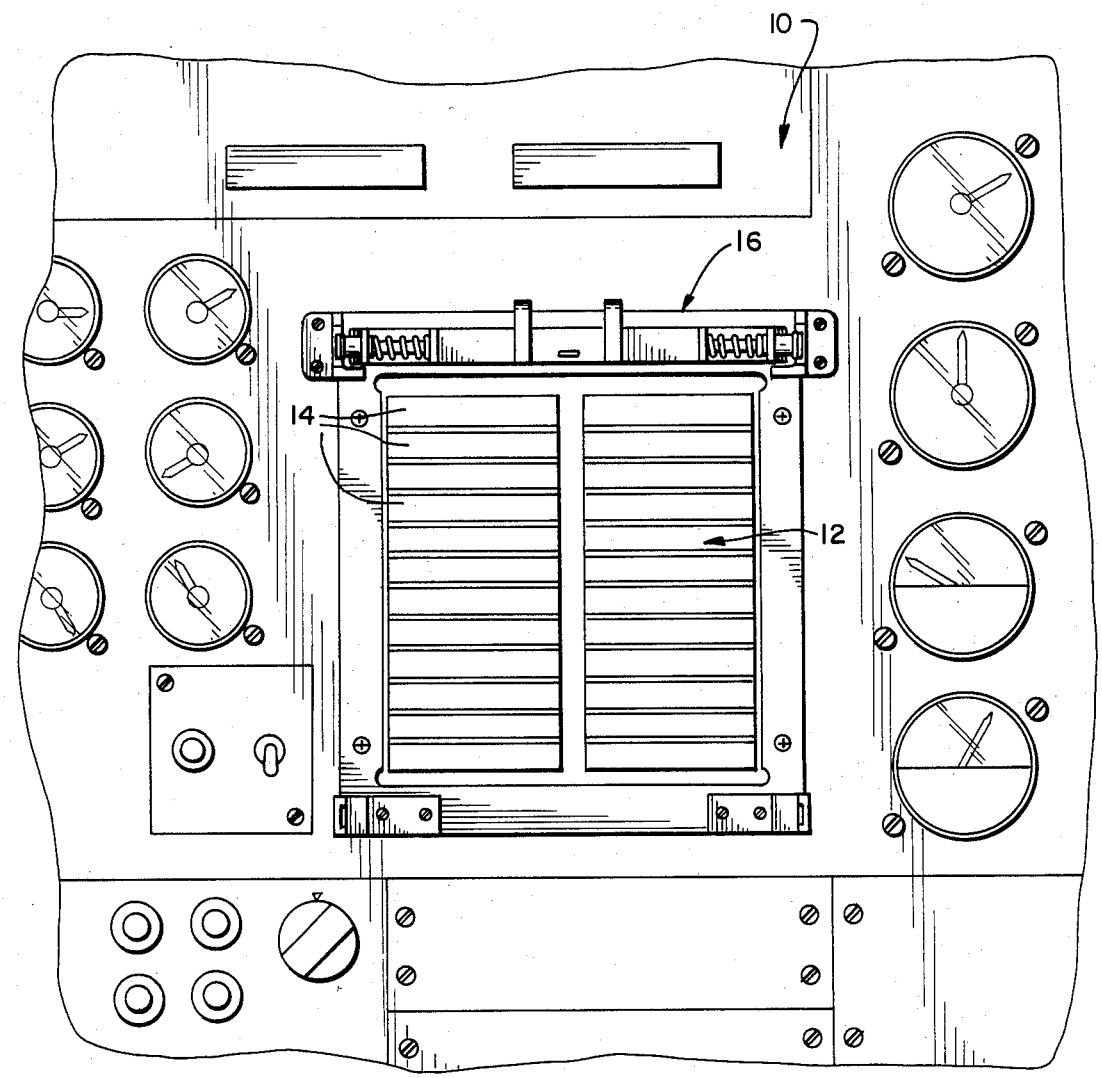
FIGS. 1-3 which are photograph reproductions illustrating the filter assembly mounted in association with an annunciator panel on the front control panel of a cockpit. These figures illustrate the stowed (FIG. 1), partially extended (FIG. 2), and fully extended (FIG. 3) filter assembly.
Figure 2:
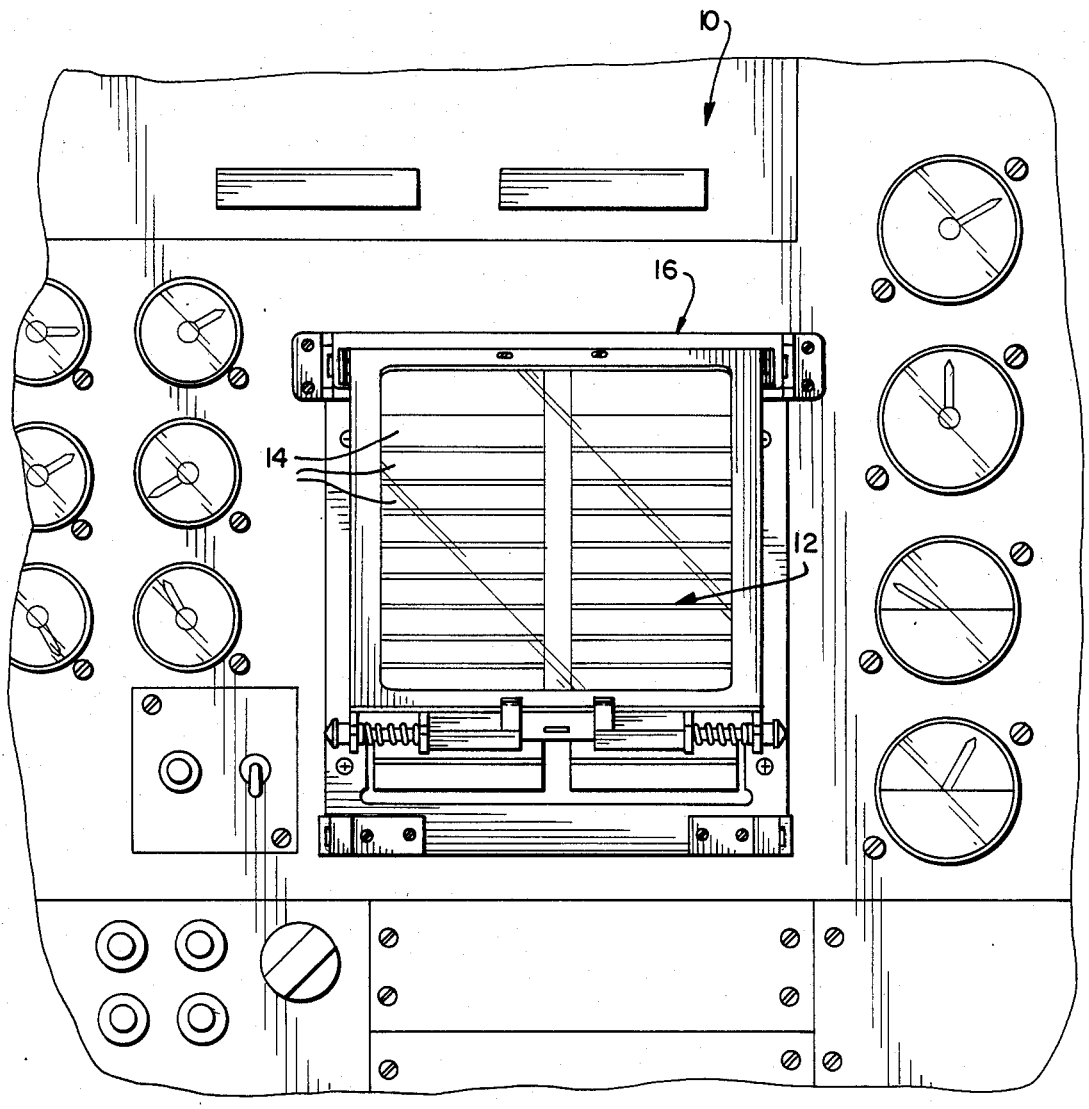
Figure 3:
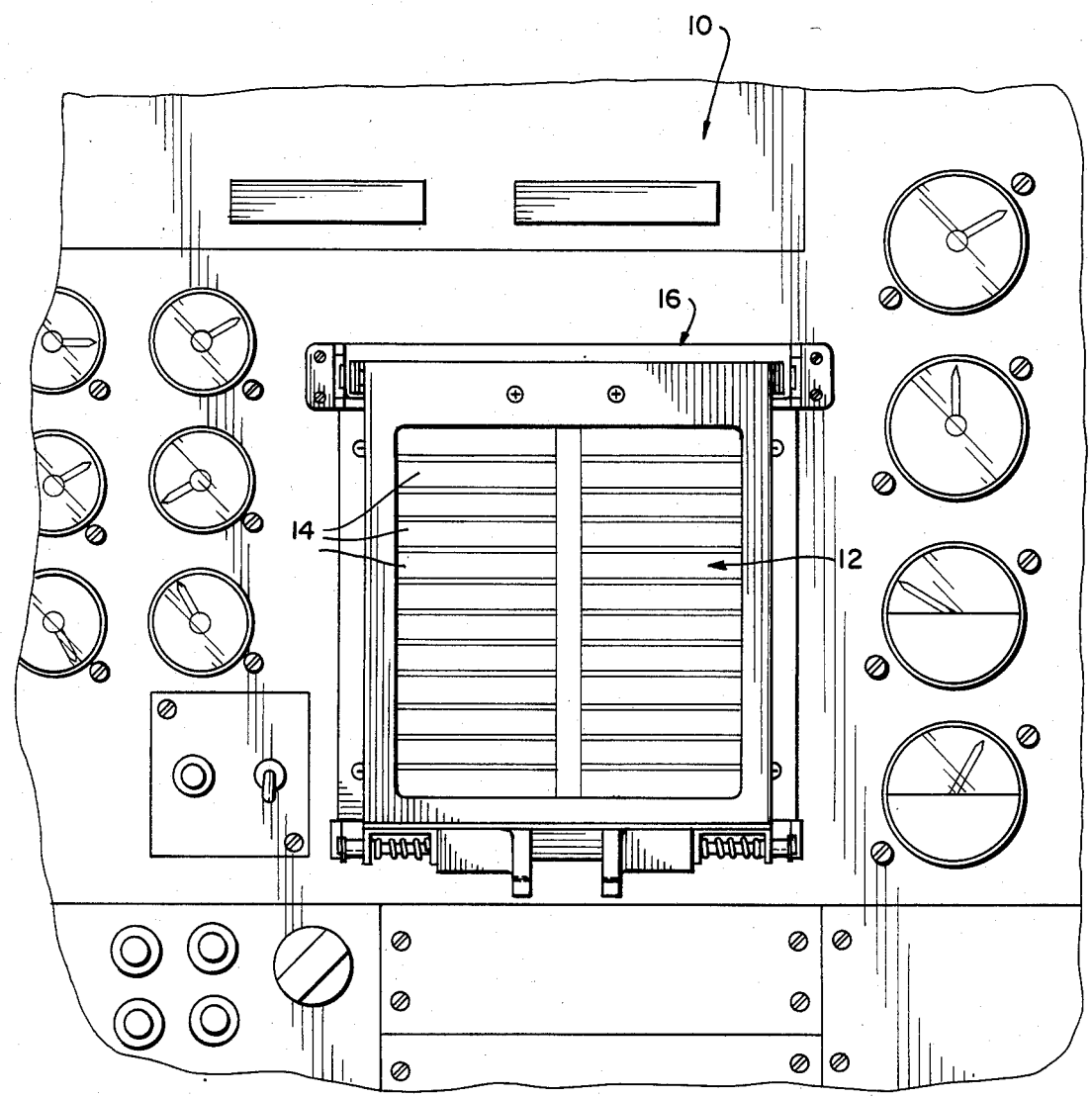

FIGS. 1-3 illustrate the environment of the present invention, i.e., the front control panel 10 in the cockpit of an aircraft such as a helicopter, the control panel includes an annunciator panel or lighted instrument panel 12 which consists of a number of lighted cartridges 14. As previously noted, the lighting from these cartridges must be filtered when operating in an NVG mode so that they can be read. For this purpose the IR filter assembly 16 of the present invention is provided. In FIG. 1, the filter 16 is shown in its stowed position, in FIG. 2, in its partially extended position, and in FIG. 3, in its fully extended or operative position for use in an NVG mode.

The IR filter assembly 16 includes a support frame 18 which is mounted by, for example, screws to the control panel 10. According to one embodiment, the mounting screws used to mount the annunciator panel to the control panel 10 can also be used to mount the support frame 18 to the control panel 10. In fact, such a mounting is preferred so that the support frame will frame the annunciator or lighted instrument panel 12 so that the individual cartridges 14 will be visible through the support frame 18. For this purpose, the support frame 18 has a generally rectangular configuration having four sides 18a-18d (FIG. 5).

Mounted to the support frame 18 is an IR filter panel mounting bracket 20 to which an IR filter panel 22 is mounted (FIG. 6). The IR filter panel 22 is mounted to the bracket 20 by the means shown in both FIGS. 8 and 10. An elastic protective strip 24 is inserted as shown to protect the filter panel during movement. The flanges 26 of the mounting bracket 20 are bonded to the filter panel by, for example, a BAC 10 type 40 adhesive.

The bracket 20, like the support frame 18, has a generally rectangular configuration having four sides 20a-20d. The side 20b has a pair of holes 28 at its two ends which receive a rivet 30 (FIG. 9) for attaching the bracket 20 to a hinge assembly 32.

Figure 4:
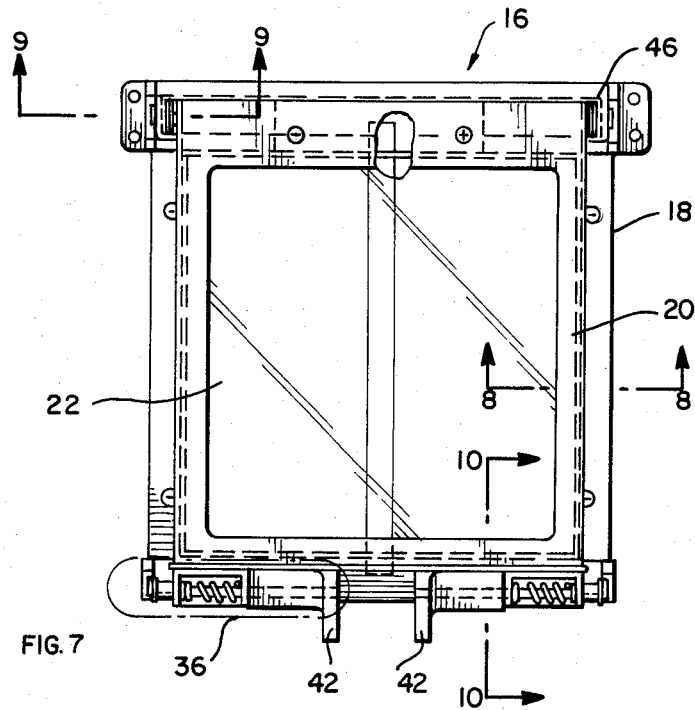
FIG. 4 is a plan view of the filter assembly.
Figure 5:
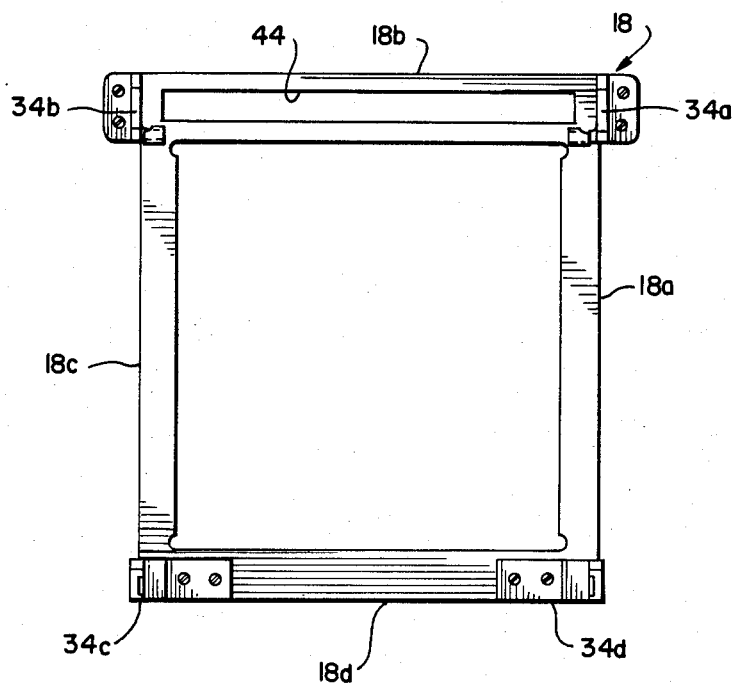
FIG. 5 is a plan view of a support plate of the filter assembly.

The support frame 18 includes a detent arrangement comprising a detent lug 34a-34d (FIG. 5). These lugs are located at approximately the corner sections formed by the sides 18a-18d. The detent lugs cooperate with a pair of locking assemblies 36 shown in FIGS. 4 and 7. Each locking assembly 36 comprises a locking pin 38 spring biased by a spring 40 in the direction of the arrow A (FIG. 7). The free end of the locking pin 38 is provided with a rounded surface which is received in a corresponding recess in the detent lugs 34a–34d. The locking assembly 36 also includes a manually engageable tab 42.

The support frame 18 as formed its top side 18b a slot 44 which registers with a slot in the control panel 10. Fitted within the slot in the control panel 10 is a stowing bracket 46 (FIG. 4). The stowing bracket 46 defines opposing tracks which are engaged by the hinge assembly 32.

While in the stowed position, the bracket 20 along with the IR panel 22 and the locking assemblies 36 are located in the stowing bracket 46 (FIG. 1). To place the IR filter 22 into position for the NVG mode, a crewmember grasps tabs 42 and moves them in the direction of arrow B (FIG. 7). This releases the locking pins 38 from their engagement with lugs 34a and 34b. The bracket 20, IR filter 22 and corresponding locking assemblies 36 is then slid horizontally out of the bracket 46 and then pivoted down into the vertical position in FIGS. 3 and 4. The tab 42 are then released permitting the locking pins 3, under the influence of the springs 40, to engage the lugs 34c and 34d thereby locking the bracket 20 and the filter into the vertical operating position.

The filter assembly according to the present invention is not a visual obstruction either in the stowed position or in the operative position. It can be operated by one hand and is instantly accessible and available to either crewman in the cockpit. The horizontal lag on the detent bracket insures that the hinge is fully extended before the filter frame can be rotated. This prevents the filter glass from striking the annunciator lights and being damaged or broken. The elastomeric channel acts as a spring which keeps the hinge assembly tightly against the frame assembly. To permit easy stowage, shoulders on the hinge contact the filter frame and stop the up rotation at the horizontal position. The center guide restrains the filter frame laterally so that it is aligned with the slot and will slide into its stowed position.

What is claimed is:

1. An IR filter assembly for use with a lighted instrument panel mounted to a control panel, comprising:
    a support frame mounted to the control panel and about the periphery of the lighted instrument panel, such that the lighted instrument panel is visible through said support frame;
    an IR filter panel;
    an IR filter panel mounting bracket to which said IR filter panel is mounted, said mounting bracket being supported on said support frame; and
    a stowing bracket mounted to the control panel perpendicularly to the mounting of the support frame, said support frame including a slot which provides access to said stowing bracket so that the IR filter and its mounting bracket can be displaced from a position in which the filter is supported to be substantially parallel with the lighted instrument panel, into a position in which the filter and its mounting bracket are received within the stowing bracket.

2. The IR filter assembly as defined in claim 1, wherein the support frame and the IR filter panel mounting bracket are of generally rectangular configuration having four sides defining an opening framing the lighted instrument panel.

3. The IR filter assembly as defined in claim 2, wherein the slot in said support frame is formed in one of said sides.

4. The IR filter assembly as defined in claim 3, wherein the side having said slot comprises the top horizontally extending side of said support frame when said support frame is viewed mounted to the control panel.

5. The IR filter assembly defined in claim 1, further comprising:
    detent means mounted to the support frame; and
    locking means mounted to the IR filter panel mounting bracket for engaging the locking means in each position of the IR filter and its mounting bracket.

6. The IR filter assembly as defined in claim 5, wherein the support frame is of generally rectangular configuration having four sides defining an opening framing the lighted instrument panel, and wherein the detent means comprise a detent lug located at each corner formed by the intersections of said sides.

7. The IR filter assembly as defined in claim 6, wherein the locking means comprise spring biased pins which engage pairs of said lugs.

8. The IR filter assembly as defined in claim 7, wherein the locking means further comprise a manually engageable tab connected to each spring biased pin, each said tab being mounted to the IR filter panel mounting bracket for displacement to vary the bias exerted by the spring of its respective spring biased pin.

* * * * *